United States Patent
Kozina et al.

(10) Patent No.: US 7,509,746 B1
(45) Date of Patent: Mar. 31, 2009

(54) CASING MEASUREMENT AND MARKING TOOL

(75) Inventors: Damian A. Kozina, Chicago, IL (US); Edward D. Adkins, Rockford, IL (US)

(73) Assignee: Nomis LLC, Hampshire, IL (US)

( * ) Notice: Subject to any disclaimer, the term of this patent is extended or adjusted under 35 U.S.C. 154(b) by 19 days.

(21) Appl. No.: 11/854,614

(22) Filed: Sep. 13, 2007

(51) Int. Cl.
*G01B 5/14* (2006.01)
(52) U.S. Cl. .......................................... 33/194
(58) Field of Classification Search ................... 33/194, 33/197, 526, 527
See application file for complete search history.

(56) References Cited

U.S. PATENT DOCUMENTS

| | | | |
|---|---|---|---|
| 79,175 | A | 6/1868 | Winterbottom |
| 313,197 | A | 3/1885 | Gaylord |
| 389,647 | A | 9/1888 | Hall et al. |
| 924,877 | A * | 6/1909 | Banfill .................. 33/197 |
| 2,144,877 | A * | 1/1939 | Zangrando ............. 33/527 |
| 2,473,639 | A | 6/1949 | Erickson |
| 3,293,764 | A | 12/1966 | Born |
| 4,355,471 | A | 10/1982 | Cross |
| 4,573,270 | A * | 3/1986 | D'Amico ............... 33/526 |
| 4,989,336 | A | 2/1991 | Waltrip, Jr. et al. |
| 5,349,758 | A | 9/1994 | Bear |
| 5,604,988 | A | 2/1997 | Costelloe |
| 5,737,844 | A | 4/1998 | Brumley |
| 5,775,036 | A | 7/1998 | Stanley, Sr. |
| 6,145,206 | A | 11/2000 | Piccirillo |
| 6,341,427 | B1 | 1/2002 | Tepley |
| 6,513,258 | B1 | 2/2003 | Casner |
| 7,240,435 | B1 | 7/2007 | Dowdakin |
| 2003/0131486 | A1 * | 7/2003 | Wallace .................. 33/194 |

OTHER PUBLICATIONS

Veritas Miter Hook; webpage; date last printed Oct. 2, 2007; 1 page; http://www.veritastools.com/Products/Page.aspx?p=83.

* cited by examiner

*Primary Examiner*—G. Bradley Bennett
(74) *Attorney, Agent, or Firm*—Reinhart Boerner Van Deuren P.C.

(57) ABSTRACT

An adjustable marking and measuring tool including a locating block and a guide block is provided. The locating block includes a pair of abutments for locating the tool in the corner of a jamb. The guide block includes a miter guide line edge for locating a guide line for longitudinally locating a piece of trim. The guide block includes a reveal guide line edge for marking the offset of the trim from an opening defined by the jamb. The position of the guide block relative to the locating block is adjustable for adjusting the amount of reveal identified by the tool. The tool may further include an engagement portion for engaging a mitered end of a trim piece. Further, the tool may include an upstanding abutment member to locate the guide block relative to a piece of trim for marking a miter line across the trim piece.

21 Claims, 10 Drawing Sheets

CASING MEASUREMENT AND MARKING TOOL

FIELD OF THE INVENTION

This invention generally relates to carpentry tools and methods of using carpentry tools, and more particularly to measurement and marking tools for measuring and marking the location of trim pieces for forming casing proximate an opening in a wall, and methods of marking trim pieces for cutting mitered ends.

BACKGROUND OF THE INVENTION

As shown in FIG. 1, windows, doors, medicine cabinets, and the like, typically include an outer frame, commonly called a jamb 100, which is installed into a rough opening 102 in a wall 103, by installing a pair of wedge-shaped shims 104 between the outside of the jamb 100 and the inner surface of the rough opening 102, and driving one or more finishing nails 106 through the jamb 100 and shims 104, and into framing of the wall 103 that defines the rough opening 102. This process leaves an unsightly gap 108 between the jamb 100 and the rough opening 102 that is typically covered, as shown in FIGS. 2 and 3, with several pieces of trim 113, 114, that are also known individually and collectively as window or door casing 110.

The inner periphery of the jambs 100 may also vary slightly over the length and width of the jamb 100, due to small amounts of dimensional differences in the width and height of the inside dimensions of the jambs 100, from one door or window to the next, even in doors and windows that are of the same nominal width and height.

In order to accommodate the above-described variations and dimensional differences, it is also common practice to position the inner edges 111, 112 of the trim pieces 113, 114 forming the casing 110 slightly back from the inner surface 115 of the jamb 100, as shown in FIGS. 2 and 3, to form space known as a reveal 116 that allows a small strip of the face 118 of the jamb 100 to remain exposed, inside of the casing 110, in the finished installation. The reveal 116 allows the position of the casing 110 to be shifted slightly, with respect to the inner surface 115 of the jamb 100, and the opening 102, to compensate for the variations and dimensional differences described above, in a manner that can be readily accomplished by a carpenter installing the casing 110, and in a way that is essentially undetectable to the eye of a casual observer of the finished installation. The reveal 116 also provides an aesthetically pleasing architectural enhancement of the appearance of the installed jamb 100 and casing 110.

Further, in some installations, the intersection of two adjacent pieces of casing is formed by two mitered ends of the adjacent trim pieces 113, 114. Typically, these ends are formed by 45 degree miter cuts on the ends of the adjacent trim pieces 113, 114.

By including 45 degree mitered ends and the reveals, carpenters are required to mark the location where the trim pieces 113, 114 are to be located as well as measure the length of the individual trim pieces 113, 114. Representative tools for assisting in locating the placement of the casing, by either marking or acting as a guide during placement, are illustrated in U.S. Pat. Nos. 6,341,427 entitled "Window Casing Installation Tool"; 2,473,639 entitled "Door Casing Gauge"; and 3,292,764 entitled "Construction Gage." The present invention is generally directed to these marking gages in combination with a tool for assisting in measuring the length of the casing.

BRIEF SUMMARY OF THE INVENTION

In one embodiment, an adjustable trim tool for assisting in installing trim pieces proximate an opening in a wall having at least one corner including a guide block, a locating block and a catch is provided. The locating block includes first and second abutments. The abutments are aligned relative to one another to form a substantially 90 degree effective angle to locate the guide block in the corner. The guide block slidably connects to the locating block. The guide block includes a guide edge extending outward beyond the first and second abutments and that is oriented within an oblique plane passing through a vertex of the effective angle. The guide block being slidable relative to the locating block in a direction being substantially parallel to the oblique plane. The catch is connected to one of the locating block or guide block. The catch and the other one of the locating block or guide block selectively engages to fix the locating block and guide block in a selected one of a plurality of discrete predetermined orientations. One of the catch or the other one of the locating block or guide block includes a detent region defining the discrete predetermined orientations. The other one of the catch and the other one of the locating block and guide block includes at least one corresponding protrusion configured to engage the detent region.

In another embodiment, a tool for assisting in installing trim pieces proximate an opening in a wall having at least one 90 degree corner is provided. The tool includes a locating block, a guide block, at least one tack, and a removable guard. The locating block includes first and second abutments. The abutments align relative to one another to form a substantially 90 degree effective angle to locate the locating block in the 90 degree corner against the inner surface of the opening. The guide block connects to the locating block. The guide block includes a guide edge extending outward beyond the first and second abutments. The guide edge is oriented within a plane extending obliquely relative to both line segments forming the effective 90 degree angle. The guide block further includes first and second adjacent walls that are spaced apart from the guide edge. The first and second walls extend obliquely relative to one another. The at least one tack extends outward from the first wall in a direction generally parallel to the second wall. The removable guard is removably attachable to the guide block to cover the at least one tack.

In yet another embodiment, a tool for assisting in installing casing proximate an opening in a wall having at least one ninety-degree corner including a locating block, a guide block and an upstanding member is provided. The locating block includes first and second abutments. The abutments align relative to one another to form a substantially 90 degree effective angle to locate the guide block in a 90 degree corner in the opening of a wall. The guide block includes first and second opposed sides. The locating block connects to the first side of the guide block, the guide block including a guide edge formed by a first face extending between the first and second sides. The first face extends outward beyond the first and second abutments. The guide edge is oriented within an oblique plane passing through a vertex of the effective angle. The oblique plane bisects the effective angle. The upstanding member extends outward beyond the second side of the guide block and away from the first side. A second face of the upstanding member is parallel with one of the first and second abutments. The second face and guide edge forms an angle equal to an angle between the guide edge and the first abutment.

In yet another embodiment, a method of marking an oblique cut line for forming a second mitered end of a trim piece is provided. The trim piece includes a first mitered end extending obliquely between an inside edge and an outside edge of the trim piece. The trim piece further includes an end face extending between the inside and outside edges and a top and bottom face of the trim piece. The effective intersections of the end face and the inside and outside edges forms first and second corners. The cut line is located at a desired length of the trim piece. The method includes the step of attaching a measurement tool to the mitered end of the trim tool by engaging the end face with at least one engagement tack of the measurement tool. The method includes the step of aligning a tape measure with one of the inside or outside edges. The method includes the step of engaging the measurement tool with an end of the tape measure aligned with the corner formed by the one of the inside or outside edges with the end face. The method includes the step of extending the tape measure along the one of the inside or outside edges at least beyond the desired length of the trim piece. The method includes the step of marking a location of a cut line identifying the desired length of the trim piece proximate the one of the inside or outside edges. The method includes the step of abutting an abutment face of the measurement tool with the one of the inside or outside edges. The method including the step of aligning a guide edge of the measurement tool with the marked location. The method also including the step of marking a cut line for the second mitered end using the guide edge as a guide, the cut line extending obliquely relative to the inside and outside edges.

Other embodiments of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
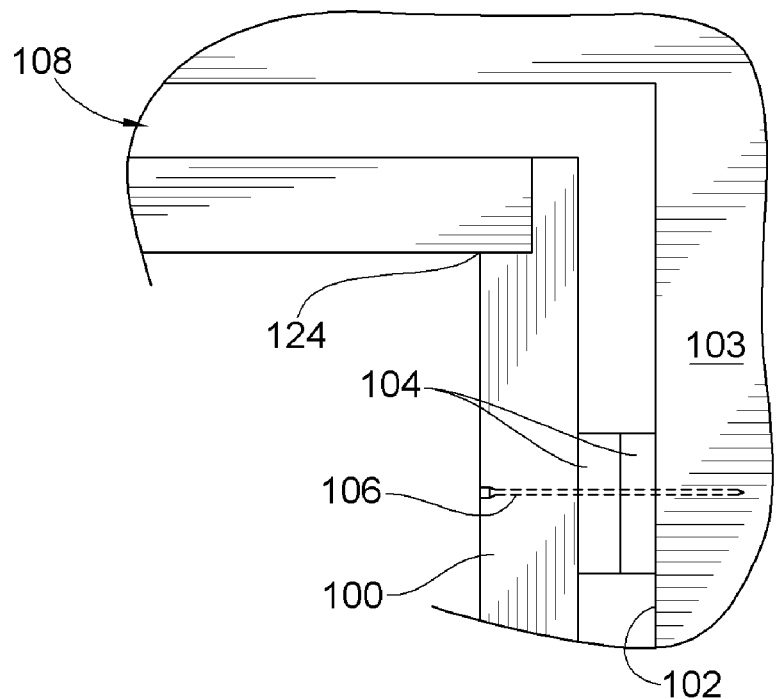
FIGS. 1-4, as described in more detail above, illustrate the type of trim and wall openings for which the invention is applicable in measuring, marking and/or locating.
Figure 2:
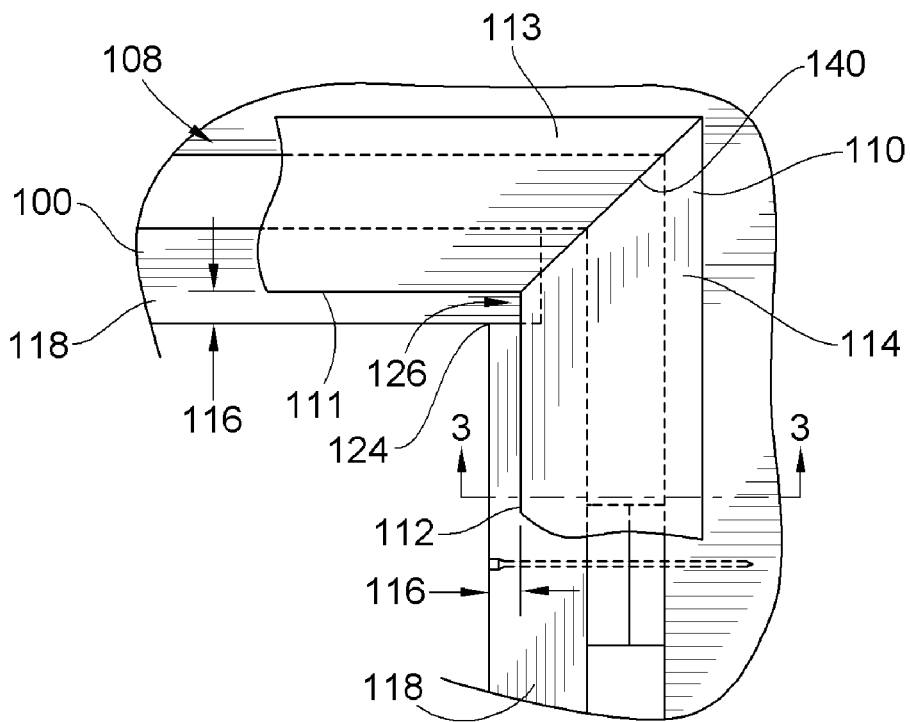
Figure 3:
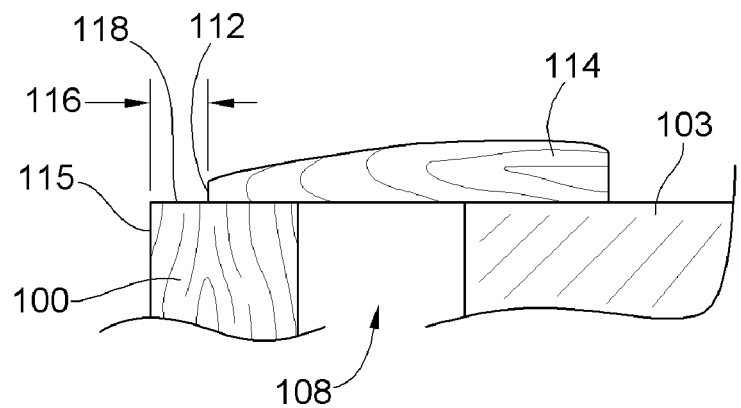
Figure 4:
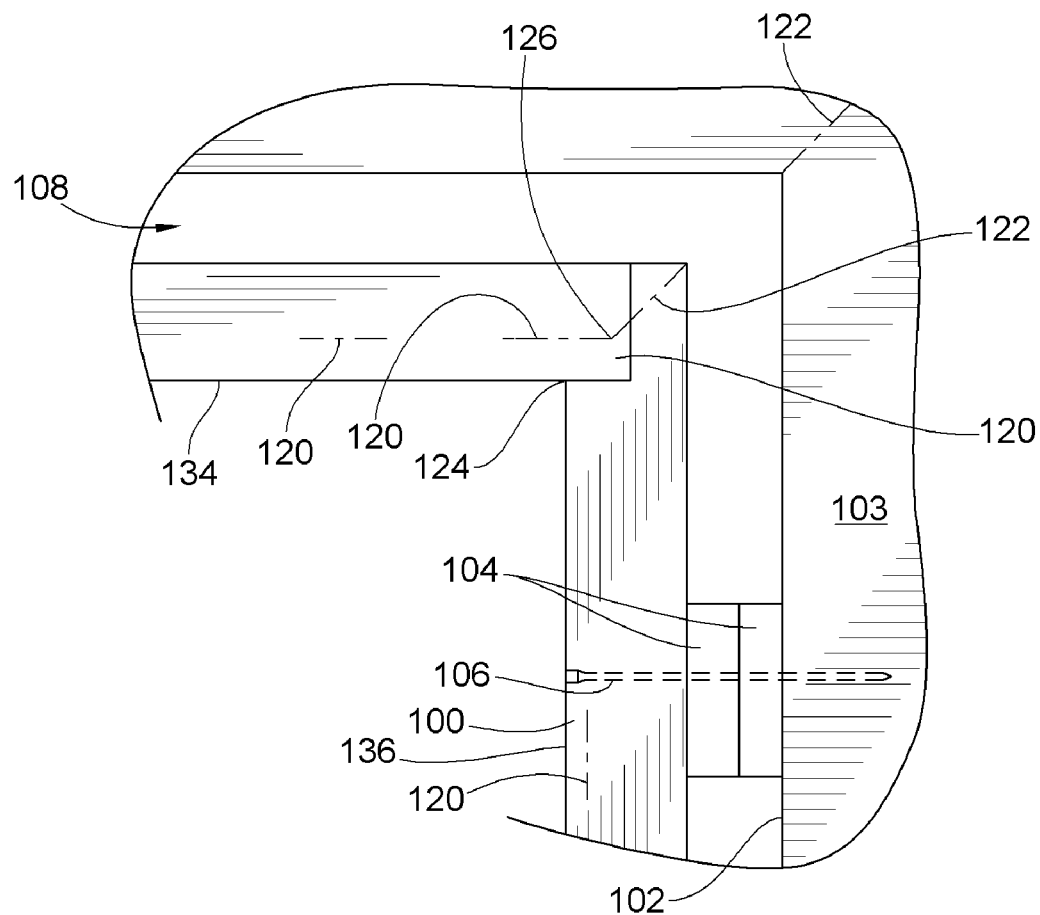
Figure 5:
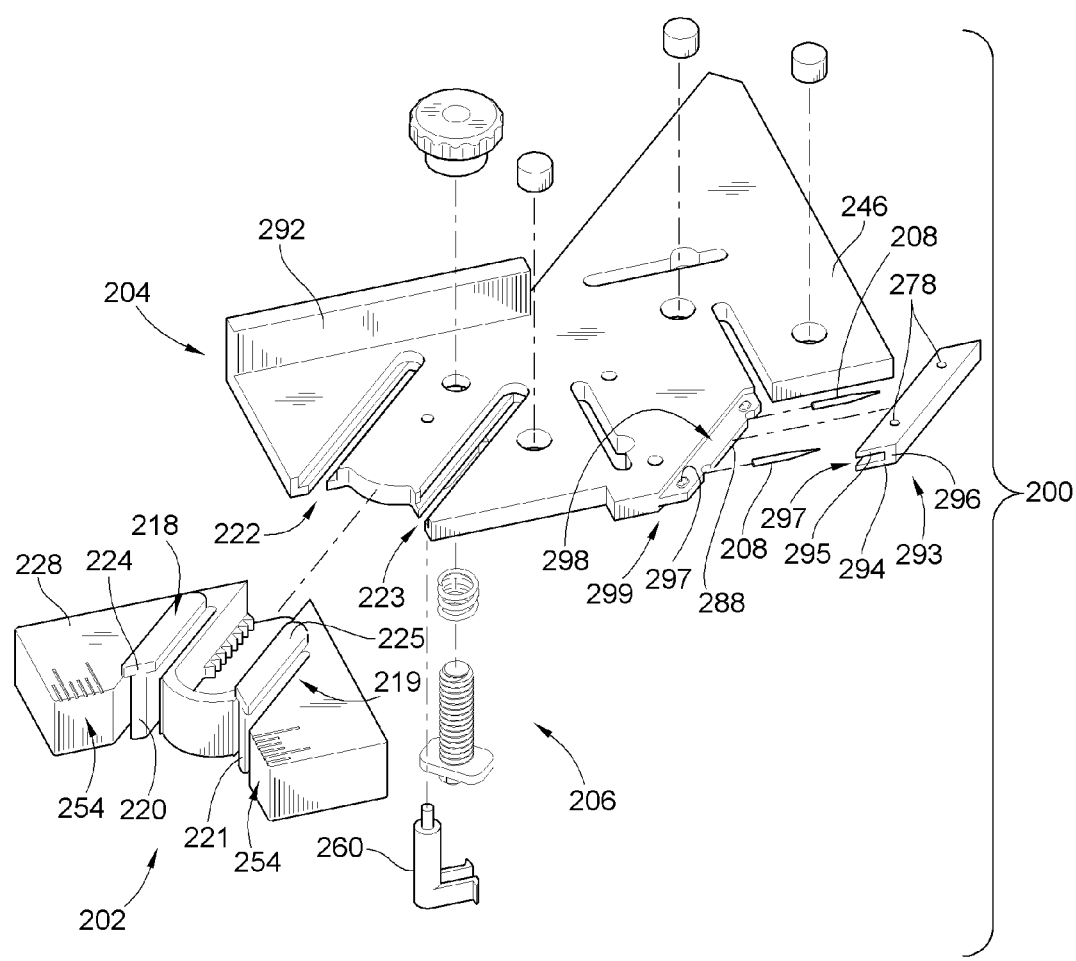
FIG. 5 is an exploded perspective view of an exemplary embodiment of a tool according to the present invention.

Referring to FIG. 5, a marking and measuring tool 200 (also referred to herein as "the tool 200") is illustrated in a perspective exploded view. The tool 200 is used for numerous tasks related to locating, measuring and cutting the previously described trim pieces 113, 114 for use in forming casing 110. The tool 200 generally includes a locating block 202, a guide block 204, a lock arrangement 206 and a set of engagement tacks 208.

One utility of the tool 200 is to establish a reveal 116 as well as to locate the trim pieces 113, 114 proximate the door jamb 100 by locating an intersection point of the two adjacent trim pieces 113, 114. More particularly the tool can be used to locate and set reveal guide lines 120 and a miter guide line 122. The reveal guide lines 120 are used to locate the offset of the trim pieces 113, 114 from the inner surface 115 of the jamb 110. The miter guide line 122 extends outward from the corner 124 of the jamb generally at a 135 degree angle relative the inner surfaces 134, 136 of the jamb 100 and reveal guide lines 120. The miter guide line 122 is generally used for determining the desired location of the ends of the adjacent trim pieces 113, 114. More particularly, the miter guide line 122 is particularly useful to locate placement of a first one of the trim pieces 113, 114.

Figure 6:
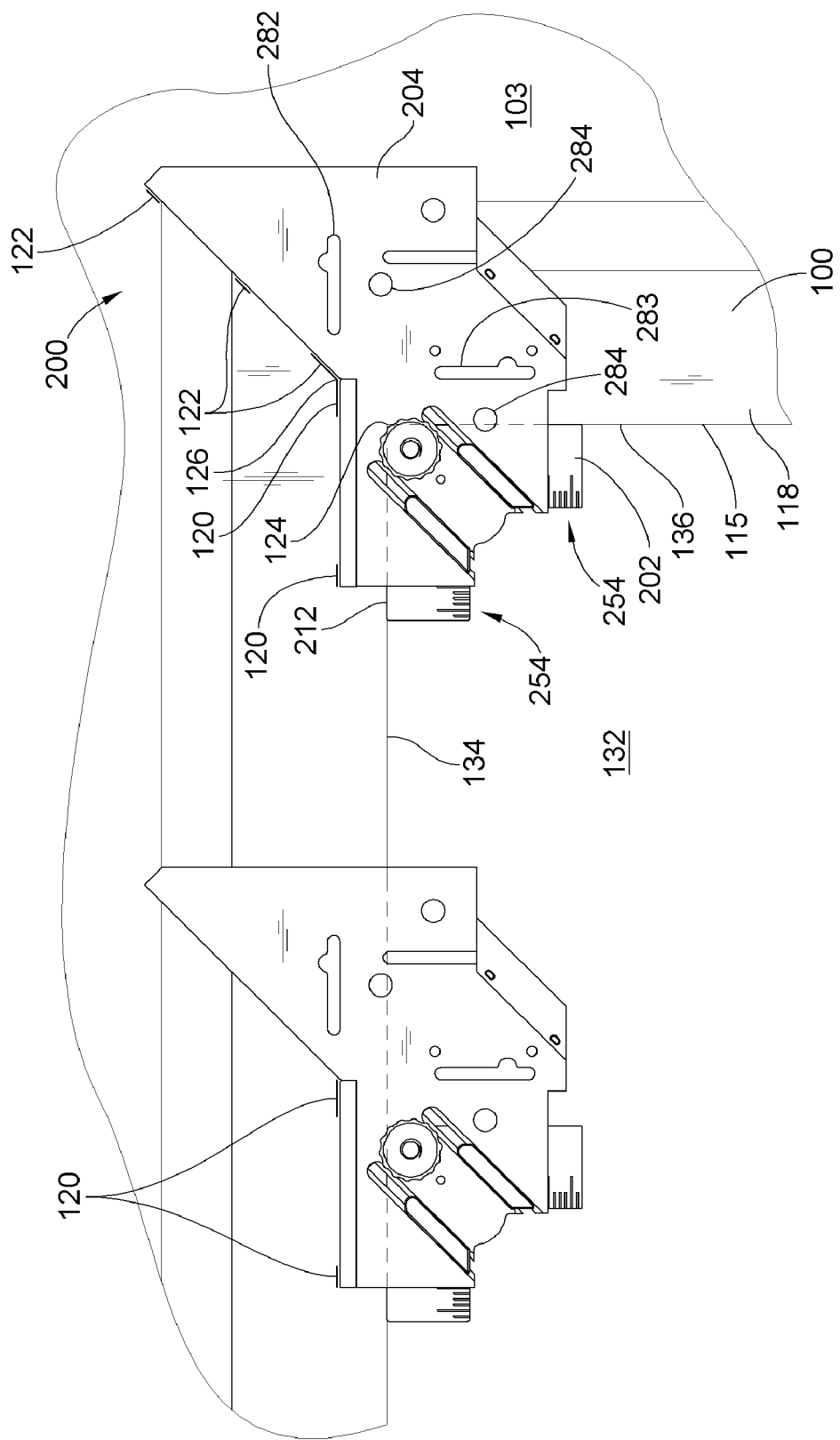
FIG. 6 is a top plan view of an embodiment of the present invention positioned proximate a corner of a door jamb.

The locating block 202 locates the tool 200 substantially within the corner 124 of the jamb 100. More particularly, the locating block 202 includes a first abutment and a second abutment that are illustrated as generally perpendicular first and second locating walls 212, 214. With further reference to FIG. 6, the faces of the first and second locating walls 212, 214 abut the adjacent faces 134, 136 of inner surface 115 of the jamb 100 to properly locate the tool 200 for marking and measuring.

One of ordinary skill in the art will recognize that the first and second abutments need not be continuous walls and could take numerous forms. The first and second abutments need only be oriented to form effective lines that form an effective 90 degree angle $\alpha$ (see FIG. 7) therebetween for locating the tool 202 within the corner 124 of the jamb 100. All that is required to provide an appropriate set of abutments to form the effective 90 degree angle is three contact points. Two contact points are required to align one of the abutments along one face 134 of inner surface 115 of the jamb 100, while the third contact point is used as a stop to abut against the perpendicularly-oriented other face 136 to locate the tool 200 along the first face 134. The third contact point locates an effective line that extends perpendicularly relative to an effective line formed by the two points of the first abutment. As illustrated in FIG. 6, the first locating wall 212 aligns with and abuts face 134 and the second locating wall 214 aligns with and abuts face 136.

The guide block 204 is a guide for the user to place the reveal guide lines 120 and the miter guide line 122. As such, the guide block 204 includes a reveal guide line edge 216 and a miter guide line edge 217. The reveal guide line edge 216 and miter guide line edge 217 of the illustrated embodiment substantially merge into one another and are offset at an angle $\beta$ of approximately 135 degrees. The reveal guide line edge 216 and miter guide line edge 217 may be separated by a small indentation at the intersection of the two edges 216, 217. Further, the reveal guide line edge 216 is substantially parallel to the first abutment 212. In the illustrated embodiment, the reveal guide line edge 216 and miter guide line edge 217 are provided by walls that extend perpendicularly between the top surface 246 and sliding surface 236 of the guide block 204. Further, edges 216, 217 could be provided by planar faces of a wall or by rounded surfaces of a face of a wall. The edges need not be the intersection line of two planes.

As illustrated in FIG. 6, with the locating block 202 positioned in the corner 124 of the opening 132 of the jamb 100, the guide block 204 overlaps the face 118 of the jamb 100 as well as the wall 103. A sliding face 236 of the guide block 204 abuts against the face 118 of the jamb 100 and the wall 103. In this position, the user can use the reveal guide line edge 216 and miter guide line edge 217 as guides to scribe the reveal guide lines 120 or miter guide line 122 on the face 118 of the door jamb 100 and the wall 103.

These guide lines 120, 122 can then be used to locate a trim piece 113, 114. More particularly, an inner edge 111 of a trim piece 113 can be aligned with the reveal guide lines 120 while a mitered end 140 of the trim piece 113 can be aligned with the miter guide line 122. It will be noted that the effective intersection of the reveal guide lines 120 and the miter guide lines 122 determines the location of the inside corner 126 of the trim piece 113.

The use of both the miter guide line 122 and reveal guide lines 120 provides additional visual checks for aligning the trim piece 113 in addition to aligning the inside corner 126 of the trim piece 113 at the corner location. In some instances, when a user cuts the mitered end of a trim piece, the end may not be perfectly straight such that the inside corner of the trim piece is offset from the rest of the end of the trim piece. In this instance, relying solely on the inside corner to align the trim piece may cause the trim piece to be longitudinally mispositioned to high relative to the desired location of the adjacent trim piece, which is subsequently installed. However, by providing both a miter guide line 122 and a reveal guide line 120, the user has multiple check points to guarantee accurate and proper placement of the trim piece.

Once the miter guide line 122 and initial set of reveal guide lines 120 are marked proximate the corner 124 of the jamb 100, the tool 200 may be used to add additional reveal guide lines 120 along the length of the jamb 100. The user merely moves the tool 200 to the new location where additional reveal guide lines 120 are desired, as illustrated by the second presentation of tool 200 in FIG. 6, and scribes additional reveal guide lines 120 on the face 118 of the jamb 100.

As it may be aesthetically pleasing to have a reveal for one door or window that is different than the reveal of another door or window, the locating block 202 and guide block 204 are adjustably connected to one another. More particularly, the locating block 202 and guide block 204 are slidably connected to one another.

Figure 8:
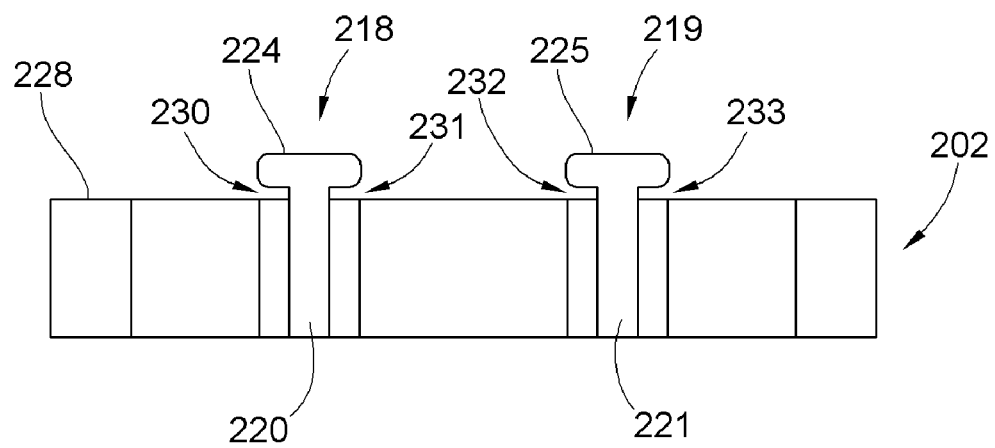
FIG. 8 is an end profile view of the locating block of the tool of FIG. 5.

With reference to FIGS. 5 and 8, the locating block 202 further includes a pair of T-shaped slidable connectors 218, 219 that slidably connect the locating block 202 to the guide block 204 by cooperating with connecting slots 222, 223 of the guide block 204.

The slidable connectors 218, 219 each include an extension wall 220, 221 and a connector tab 224, 225. The extension walls 220, 221 extends the connector tabs 224, 225 beyond a sliding surface 228 of the locating block 202 to form gaps 230-233 between the connector tabs 224, 225 and the sliding surface 228.

Figure 9:
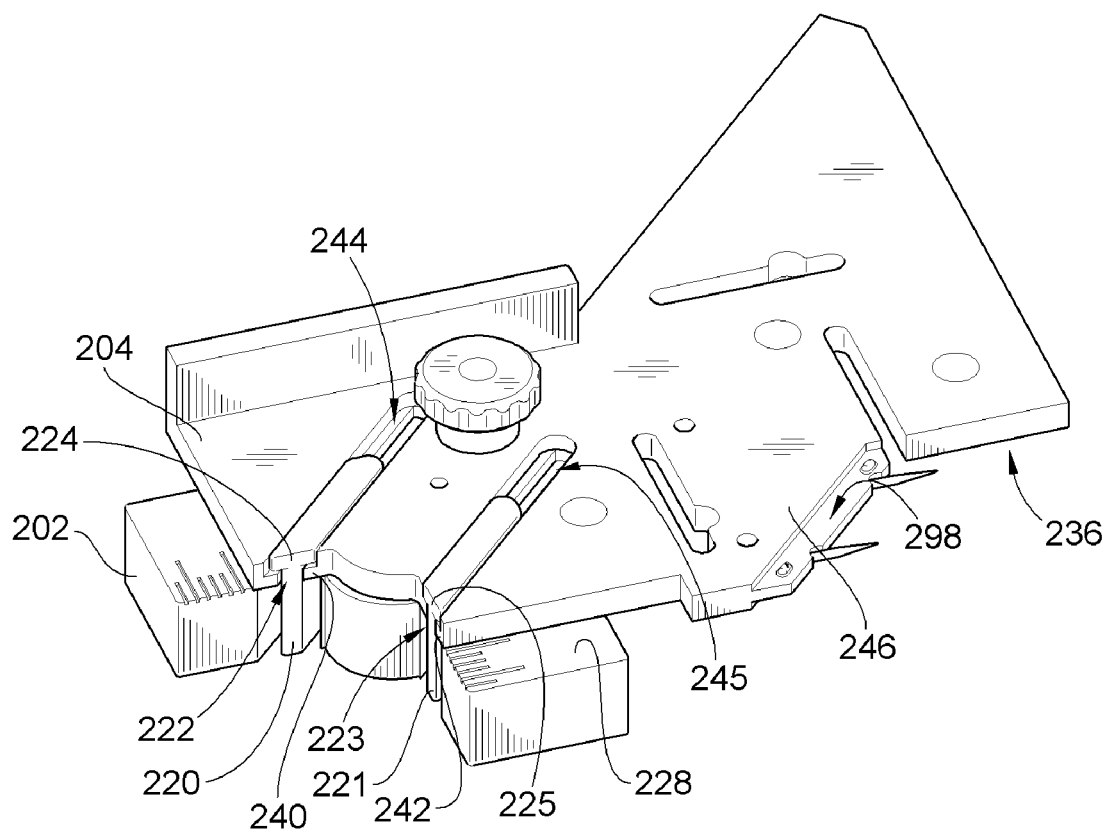
FIG. 9 is a top perspective view of the tool of FIG. 5.

As further illustrated in FIG. 9, the connecting slots 222, 223 slidingly receive the extension walls 220, 221 to slidingly connect the locating block 202 to the guide block 204. When connected, the sliding surface 228 of the locating block abuts a sliding surface 236 of the guide block 204. Sliding surfaces 228, 236 slide relative to one another while adjusting the configuration of tool 200. The sliding slots 222, 223 are surrounded by pairs of shelves 240, 242 formed by recesses 244, 245, in a top surface 246, being opposite of the sliding surface 236, of the guide block 204.

In the illustrated embodiment, the recesses 244, 245 are sized wide enough to receive the width of the connector tabs 224, 225 and are deep enough such that the tops of the connector tabs 224, 225 are substantially flush with the top surface 246 of the guide block 204 when the locating block 202 and guide block 204 are connected together. Further, the height of the shelves 240, 242, i.e. in the direction extending between the top surface 246 and the sliding surface 236, is substantially equal to or slightly less than the height of the gaps 230-233 formed between the connector tabs 224, 225 and the sliding surface 228 of the locating blocks. This close size relationship helps prevent excess slop between the locating block 202 and the guide block 204.

In other embodiments, the recesses 244, 245 and pairs of shelves 240, 242 are not required such that the connector tabs 224, 225 directly contact and extend above the top surface 246 of the guide block 204 when the locating block 202 and guide block 204 are connected.

Figure 7:
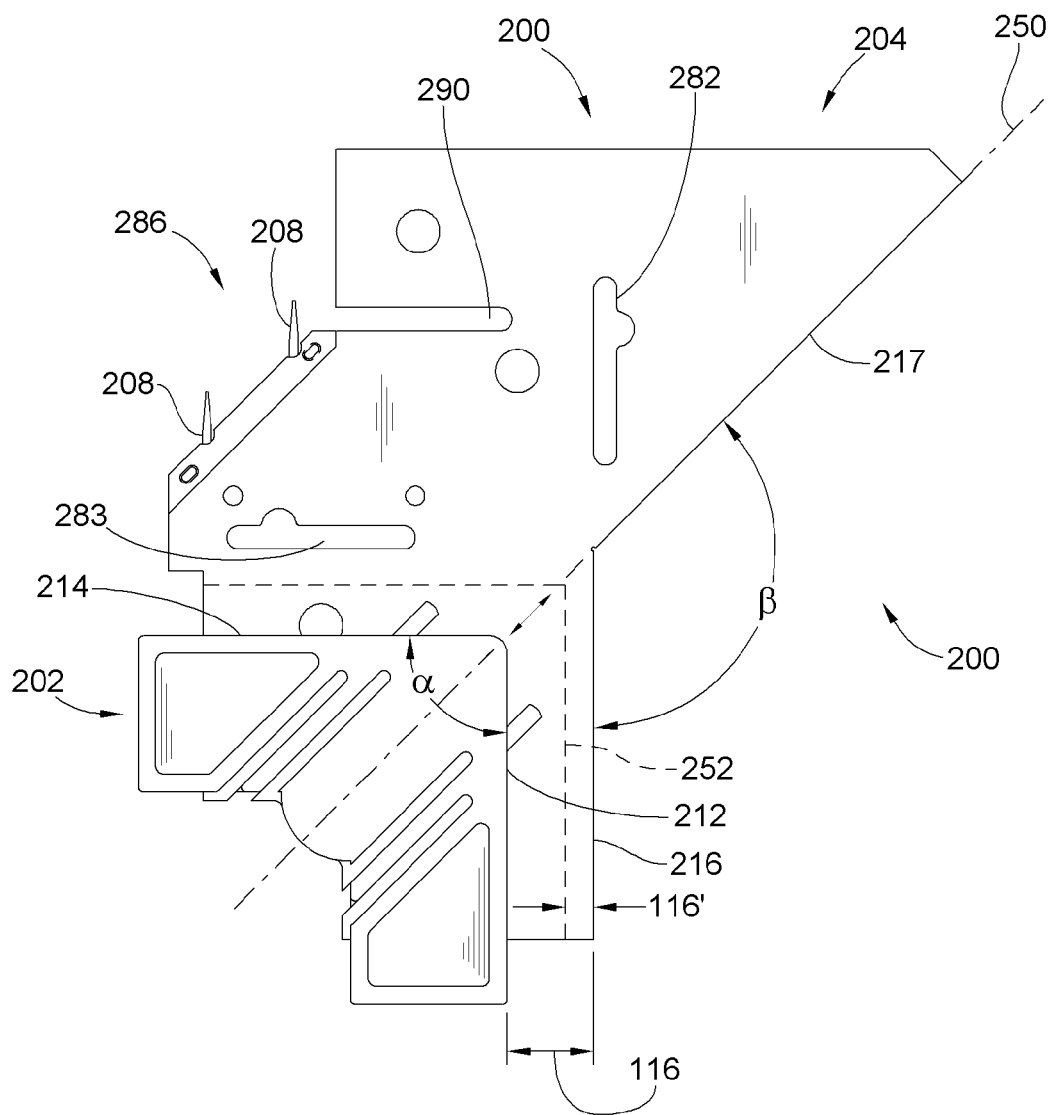
FIG. 7 is an assembled bottom view of the tool of FIG. 5.

Referring to FIGS. 6, 7 and 9, in the illustrated embodiment, the miter guide line edge 217, slidable connectors 218, 219, and sliding slots 222, 223 are generally aligned parallel to one another and extend at either 45 degrees or the complementary 135 degrees relative to both the first and second abutments in the form of locating walls 212, 214. Further, the miter guide line edge 217 is aligned with an axis 250 that passes through the vertex of effective angle $\alpha$, thereby bisecting effective angle $\alpha$. The axis 250 defines a bisecting plane that includes the axis 250 and extends perpendicularly to the top surface 246 and sliding surface 236. This relative orientation allows the reveal 116 to be adjusted without improperly aligning the miter guide line edge 217 relative to either the first and second abutments, which would similarly improperly align the miter guide line edge 217 relative to either of the portions of the jamb 100 forming corner 124.

The proper orientation occurs because as user adjusts the location of the locating block 202 relative to the guide block 204, both locating walls 212, 214 move relative the miter guide line edge 217 the same distance. FIG. 7 illustrates the adjustment of the locating block 202 relative to the guide block 202. The locating block 202 moves relative to the guide block 204 along axis 250. The first position that is illustrated provides a first reveal 116 while a second position, illustrated by dashed line 252, provides a second reveal 116'.

As illustrated in FIG. 5, the sliding surface 228 of the locating block 202 includes a pair of reveal gages 254 that can easily identify the amount of reveal that the tool 200 is set to provide. The gages 254 include a plurality of spaced apart tick marks which may be integrally formed in the material of the locating block 202 or painted or stuck onto the locating block 202. The tick marks may have any spacing, but it is preferred to have the spacing be in even increments, and more preferably in even increments of one-eighth of an inch, one-tenths of an inch or metric such as in millimeters. The amount of reveal is identified by the corresponding tick mark with which the guide block 204 aligns. The first tick mark identifies a reveal of one-eighth of an inch and the third tick mark identifies a reveal of three-eighths of an inch if the spacing is set to equal increments of one-eighth of an inch.

Figure 10:
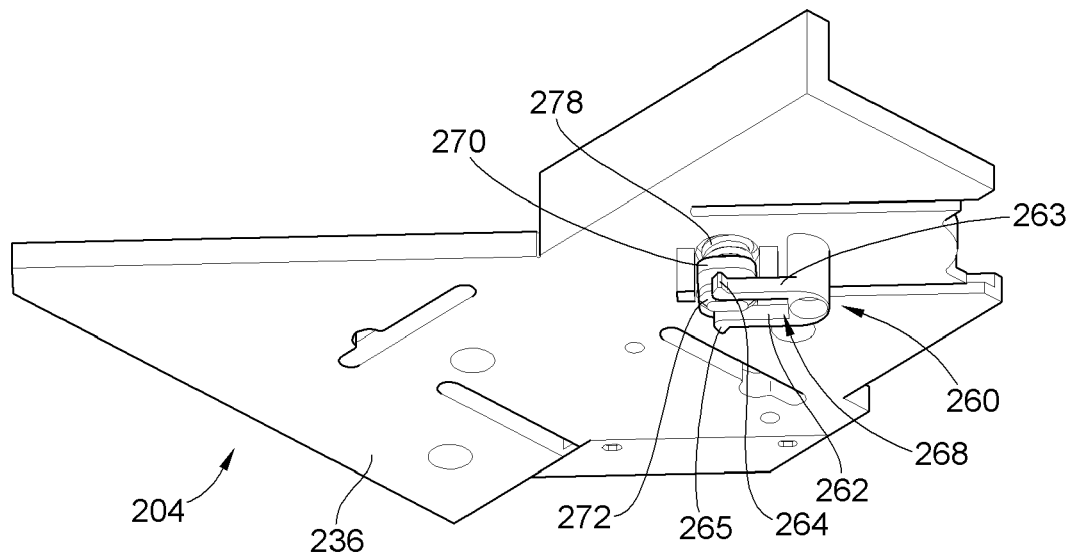
FIG. 10 is a partial bottom view of the tool of FIG. 5 with the locating block removed to illustrate the lock arrangement.
Figure 11:
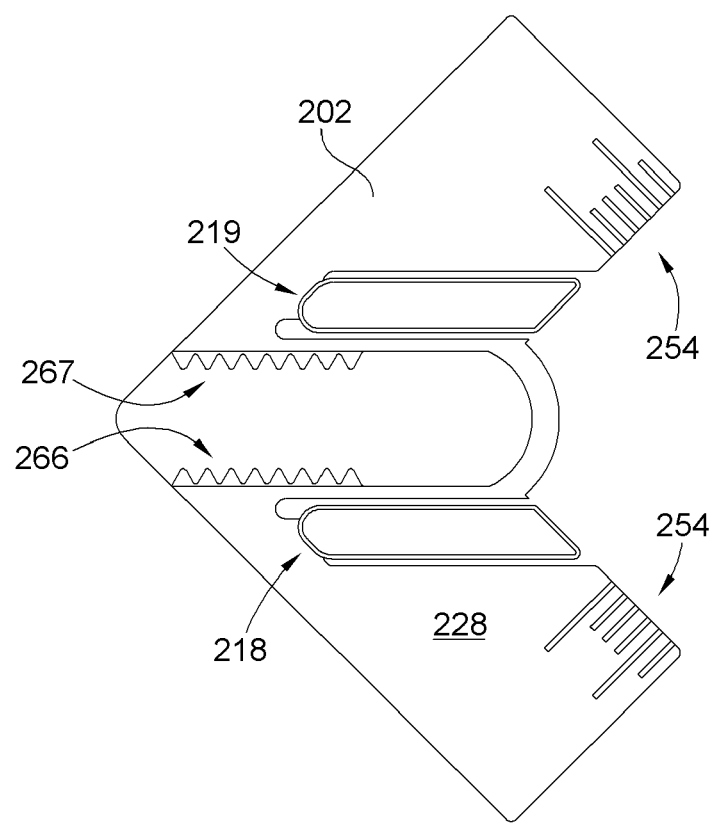
FIG. 11 is a top plan view of the locating block of the tool of FIG. 5.

With reference to FIGS. 10 and 11, the lock arrangement 206 further facilitates adjustment of the guide block 204 relative to the locating block 202 and maintaining the relative positions of the two components. The illustrated lock arrangement 206 generally includes a catch that cooperates with a detented region. More particularly, the catch takes the form of a double pawl member 260 that includes a pair of pawls 262, 263 that are resiliently connected to one another in back-to-back relation such that the protrusion 264, 265 of each pawl 262, 263 extends outward and away from the other pawl 262, 263. The pawls 262, 263 are affixed to locating block 204 on the sliding surface side. The detented region in the illustrated embodiment includes two detented portions 266, 267. The detented portions 266, 267 are formed by a plurality of adjacent detents formed by adjacent peaks and valleys. The protrusions 264, 265 engage corresponding ones of the detented portions 266, 267 to fix the position of the locating block 202 relative to the guide block 204 in a locked position.

The pawls 262, 263 pivot about an axis that is generally perpendicular to sliding surface 236 and, therefore, within a plane that is generally parallel to sliding surface 236. The two adjacent pawls 262, 263 define a relief slot 268 therebetween. The relief slot permits the pawls 262, 263 to pivot, i.e. resiliently flex, towards and away from one another. In an unlocked position, in which the locating block 202 may be repositioned relative to the guide block 204, the pawls 262, 263 flex toward one another and disengage the detented portions 266, 267.

In the illustrated embodiment, the lock arrangement 206 further includes a lock in the form of a plunger 270 that selectively fixes the pawls 262, 263 in engagement with the detented portions 266, 267. The plunger 270 includes a head 272 that is selectively insertable into the relief slot 268 to prevent the pawls 262, 263 from pivoting towards one another such that the protrusions 264, 265 may disengage the corresponding detented portions 266, 267. The head 272 is tapered to facilitate insertion between the two pawls 262, 263.

The plunger 270 further includes a threaded shaft 274 connected to the head 272, which passes through an aperture in the guide block 204. On the top surface side of the guide block 204, a handle 276 threads onto the threaded shaft 274. The handle 276 facilitates lifting the head 272 towards the guide block 204 and out of the relief slot 268 to unlock the lock arrangement. A biasing spring 278 acts to bias the head 272 away from the guide block 204 and into the relief slot 268 to maintain the lock arrangement 206 in the locked position.

Alternative embodiments of the lock arrangement are contemplated. First, the detent region could be formed in the guide block 204 and the catch could be fixed to the locating block 202. Further, only a single pawl may be required. Further, the pawl or pawls could pivot about an axis that is perpendicular to axis 252 such that the pawl pivots in a plane that is generally perpendicular to sliding surfaces 228 and 236. Further, the pawl could be sufficiently rigid or biased towards the detented portions 266, 267 such that a lock is not required to maintain the engagement of the protrusions 264, 265 with the detented portions 266, 267. Further, the catch could be integrally and/or unitarily formed with either of the locating or guide blocks 202, 204. Additionally, the catch could be in the form of plunger 270 such that the head 272 of the plunger would engage a detented region of the locating block or vice versa.

By using a detented region and catch configuration, the locking arrangement 206 can fix the locating block 202 relative to the guide block 204 in predetermined orientations. As the catch can only engage a single detent position, the detent positions provide discrete predetermined orientations. Further, as the taper of the detents self-locates the catch, the discrete orientations have an accurate and repeatable means of setting the reveal. This configuration simplifies and increases accuracy of adjustment of the reveal 116 provided by the tool 202.

In other arrangements where a continuous adjustment arrangement is utilized, a user does not know that he or she has the exact desired reveal amount. In the present arrangement, the exact reveal is automatically provided and maintained when the catch engages a detent. Further, when a continuous adjustment arrangement is utilized, the locating block 202 could slide relative to the guide block 204 over time, particularly if the user sets the tool down or carries it in a pocket or carpenter's belt.

In addition to marking the reveal guide lines 120 and miter guide lines 122, the tool 200 can be used for numerous other tasks. As illustrated in FIG. 6, the tool 200 includes a plurality of tape measure tab receiving slots 282, 283 that are generally aligned with the intersection of the miter guide line edge 217 and the reveal guide line edge 216. The tape measure tab receiving slots 282, 283 also extend parallel to the first and second locating walls 212, 214, respectively.

Figure 12:
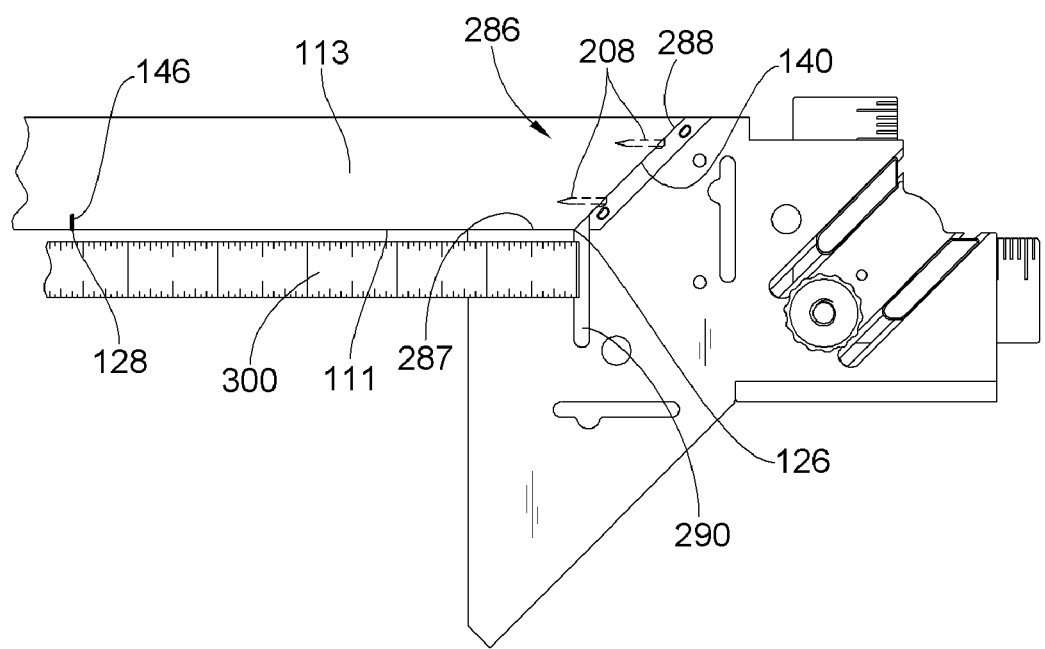
FIG. 12 is a plan view of the tool of FIG. 5 being used to mark the desired length of a trim piece.
Figure 13:
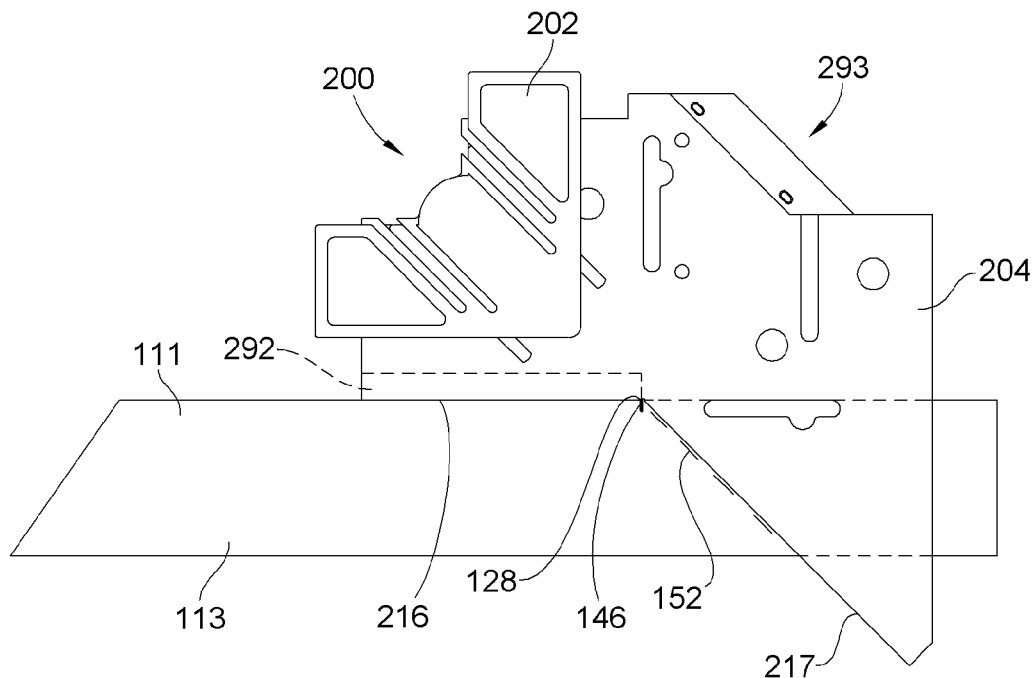
FIGS. 13 and 14 illustrate the tool of FIG. 5 being used to mark the miter line for cutting a mitered end of a trim piece.
Figure 14:
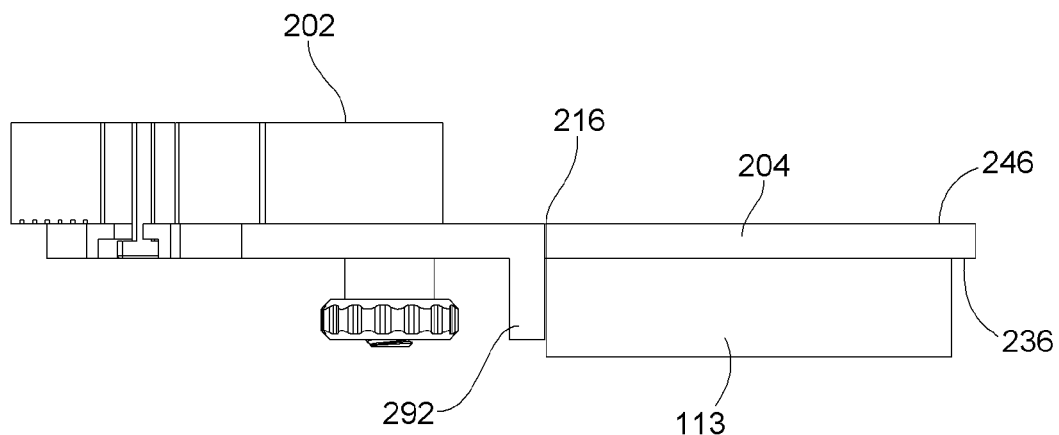

The tape measure tab receiving slots 282, 283 can be used to secure the free end of a tape measure (see e.g. FIG. 12) to facilitate measuring the requisite length of the short side of the trim pieces. For example, with the tool 200 positioned against a wall 103, as illustrated in FIG. 6, the user can use the tape measure tab receiving slots 282, 283 to engage the tab of a tape measure and then measure the length of opening of the jamb 100 which corresponds to the length of the short side of the trim pieces.

The tool 200 further includes magnets 284 which facilitate to attract a metal tape measures toward the tool 200 when used to measure.

As it can be difficult to measure a trim piece once the end of a trim piece is mitered to the desired angle, a further feature of embodiments of the present invention is that it can be used to facilitate measuring and marking a trim piece with a miter cut line for accurately cutting the trim to the required length.

Tool 200 includes a miter end engagement portion 286 used to engage a mitered end 140 of a trim piece 113 for appropriately aligning a free end of a tape measure 300 with the inside corner of the mitered end 140 of trim piece 113 that extends obliquely between the inside and outside edges of the trim piece 113 so that the user can mark the opposite inside corner 128 at the other end of the trim piece 113 for cutting the second end of trim piece 113. In the illustrated method, the mitered end engagement portion 286 is configured to engage the inside corner 126 of the mitered end 140. However, in alternative embodiments, the mitered end engagement portion can be configured to engage the outside corner of the mitered end. One of ordinary skill in the art would recognized The miter engagement portion 286 is formed by a combination of an inside edge engagement face 287 and a miter end engagement face 288 of the guide block 204. The inside edge engagement face 287 abuts against and aligns generally parallel with the inside edge 111 of the trim piece 113. The miter end engagement face 288 abuts against and aligns generally parallel with the mitered end 140 of the trim piece 113. In the illustrated embodiment, the trim piece 113 is being mitered at a 45 or 135 degree angle. As such, the inside edge engagement face 287 and miter end engagement face 288 are similarly aligned at a 135 degree angle. The faces 287, 288 are preferably formed by surfaces that extend perpendicularly between the sliding surface 236 and top surface 246.

To prevent the tool 200 from slipping relative to the trim piece 113 while extending the tape measure 300 along the inside edge 111 for measuring and marking the second inside corner 128, the miter end engagement portion 286 includes engagement tacks 208 for engaging the end face of mitered end 140 of the trim piece 113. The end face extends obliquely between the inside and outside edges of the trim piece and vertically between top and bottom faces of the trim piece. The engagement tacks 208 preferably extend in substantially parallel relation to the inside edge engagement face 287. In this configuration, the inside edge 111 of the trim piece 113 can be aligned with the inside edge engagement face 287 of the guide block 204 and slid along and parallel to the inside edge engagement face 287 as the mitered end 140 engages the engagement tacks 208.

The miter engagement portion 286 further includes a tape measure tab engagement slot 290. This slot 290 aligns the tab of the tape measure 300 with the inside corner 126 of the trim piece 113. The user can engage the slot 290 with the tape measure 300 and pull and extend the tape measure 300 towards the other end of the trim piece 113 and make a mark 146 to mark the desired length of the trim piece 113 for cutting the second end.

Once the desired length is marked, such as with mark 146, the tool 200 can be used to provide a miter cut line 152 where the second end of the trim piece 113 is to be cut. To mark the miter cut line 152, the miter guide line edge 217 is aligned with mark 146. To align the miter guide line edge 217 with the mark 146, an upstanding guide member 292 is aligned with the inside edge 111 of the trim piece 113. In the illustrated embodiment, the upstanding guide member 292 and reveal guide line edge 216 are mutually formed by a vertical abutment face of the guide block 204 that extends perpendicularly relative to the sliding surface 236 and the top surface 244. The upstanding guide member 292 prevents the tool from shifting laterally across the trim piece 113 while marking the miter cut line 152.

In the illustrated method and embodiment, the mitered end engagement portion 286 is configured to engage the inside corner 126 of the mitered end 140. However, in alternative embodiments, the mitered end engagement portion can be configured to engage the outside corner of the mitered end.

The tool 200 includes a removable guard 293 that is attachable to the guide block 204 to cover the engagement tacks 208. The guard 293 includes two spaced-apart walls 294, 295 connected by an end wall 296 to define a slot 297 therebetween. In the illustrated embodiment, the top surface 246 and sliding surface 236 include recessed portions 298, 299 proximate the miter end engagement face 288 such that the thickness between the two surfaces 236, 246 at these recessed portions 298, 299 is less than the thickness between adjacent portions of these surfaces 236, 246. The amount of recess for each portion 298, 299 corresponds to the thickness of the first and second walls 294, 295 of the guard 293 such that when the guard 293 is installed on the guide block 204, the outer surfaces of the first and second walls 294, 295 are substantially flush with the top surface 246 and sliding surface 236.

The recessed portions 298, 299 of the guide block 204 include a plurality of nibs 297 for engaging corresponding apertures 278 in the first and second walls 294, 295 of the guard 293 to secure the guard 293 to the guide block 204.

In alternative embodiments, the locating block 204 need not include the recessed portions.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An adjustable tool for assisting in installing trim pieces proximate an opening in a wall having at least one ninety-degree corner, the tool comprising:
   a locating block having first and second abutments, the abutments aligned relative to one another to provide a substantially ninety-degree effective angle to locate the guide block in the ninety-degree corner;
   a guide block slidably connected to the locating block, the guide block including a guide edge extending outward beyond the first and second abutments and extending within an oblique plane passing through a vertex of the effective angle that extends obliquely to both effective lines of the effective angle, the guide block being slidable relative to the locating block in a direction being substantially parallel to the oblique plane; and
   a catch connected to one of the locating block or guide block, the catch and the other one of the locating block or guide block selectively engageable to fix the locating block and guide block in a selected one of a plurality of discrete predetermined orientations, one of the catch or the other one of the locating block or guide block includes a detent region defining the discrete predetermined orientations and the other one of the catch and the other one of the locating block and guide block includes at least one corresponding protrusion configured to engage the detent region.

2. The tool of claim 1, wherein the oblique plane is a bisecting plane that bisects the effective 90 degree angle and extends at a one-hundred thirty-five degree angle to the first and second abutments.

3. The tool of claim 2, wherein the catch is in the form of at least one pawl that includes the protrusion and the other one of the locating block and guide block includes the detent region.

4. The tool of claim 3, further comprising a lock selectively maintaining the pawl in engagement with the detent region.

5. The tool of claim 4, wherein the lock includes a locked position wherein it is oriented proximate the pawl to prevent the pawl from being biased out of engagement with the detent region and an unlocked position oriented relative to the pawl to permit the pawl to be biased out of engagement with the detent region.

6. The tool of claim 5, wherein the pawl pivots about an axis substantially parallel to the bisecting plane.

7. The tool of claim 6, wherein the at least one pawl includes two pawls in back-to-back relation forming a relief slot therebetween and the other one of the locating block and scribe block includes two detent regions, the lock inserting into the relief slot in the locked position and removed from the relief slot in the unlocked position.

8. The tool of claim 5, wherein the pawl pivots about an axis substantially orthogonal to the bisecting plane.

9. The tool of claim 2, wherein adjacent detents in the detent region are equally spaced apart.

10. The tool of claim 2, wherein the guide block further includes a reveal guide edge that extends parallel to the portion of the first abutment that forms a portion of the effective ninety-degree angle.

11. The tool of claim 10, wherein the guide block includes a top surface and a first sliding surface opposite the top surface, the first sliding surface bearing against a second sliding surface of the locating block, the guide edge and reveal guide edge being formed by a first and a second face, respectively, extending perpendicularly between the top surface and first sliding surface.

12. The tool of claim 1, wherein the catch is unitarily formed in one of the locating block or guide block.

13. A tool for assisting in installing trim pieces proximate an opening in a wall having at least one ninety-degree corner, the tool comprising:
    a locating block having first and second abutments, the abutments aligned relative to one another to form a substantially ninety-degree effective angle to orient the locating block in the ninety-degree corner;
    a guide block connected to the locating block, the guide block including a guide edge extending outward beyond the first and second abutments and oriented within a plane extending obliquely relative to both line segments forming the effective ninety-degree angle, the guide block further including first and second adjacent walls being spaced apart from the guide edge, the first and second walls extending obliquely relative to one another;
    at least one tack extending outward from the first wall in a direction generally parallel to the second wall; and
    a removable guard attachable to the guide block to cover the at least one tack.

14. The tool of claim 13, wherein the guard includes at least two spaced apart walls defining a gap therebetween, wherein the gap is sized to receive a portion of the guide block therein.

15. The tool of claim 14, wherein the guide block defines first and second opposed faces, wherein a first portion of the guide block has a first thickness extending between the first and second faces, and the guide block includes a second portion wherein the first face includes a first recessed portion and the second face includes a second recessed portion aligned with the first recessed portion, the first and second recessed portions defining a second thickness therebetween, wherein the first wall extends between the first and second recessed portions, wherein the gap is substantially equal to the second thickness and when the guard is attached to the guide block, an outer surface of each of the walls of the guard are flush with the first and second faces of the first portion of the guide block.

16. The tool of claim 15, wherein the guide block and guard have corresponding engagement structure for securing the guard to the guide block.

17. The tool of claim 15, wherein the guide block further includes a slot intersecting the first and second walls at an effective intersection of the first and second walls, the slot extending perpendicular to the second wall and away from the first wall.

18. A tool for assisting in installing casing proximate an opening in a wall having at least one ninety-degree corner, the tool comprising:
    a locating block having first and second abutments, the abutments aligned relative to one another to form a substantially ninety-degree effective angle to locate the guide block in the ninety-degree corner;
    a guide block having first and second opposed sides, the locating block connected to the first side of the guide block, the guide block including a guide edge formed by a first face extending between the first and second sides extending outward beyond the first and second abutments, the guide edge being oriented within an oblique plane passing through a vertex of the effective angle and bisecting the effective angle; and
    an upstanding member extending outward beyond the second side of the guide block and away from the first side, a second face of the upstanding member being parallel with one of the first and second abutments, and the second face and guide edge forming an angle equal to an angle between the guide edge and the first abutment.

19. The tool of claim 18, wherein the locating block further includes a reveal guide edge substantially intersecting and extending at a one-hundred thirty-five degree angle with the guide edge, the reveal guide edge being formed by the face of the upstanding member.

20. The tool of claim 19, wherein the face of the upstanding member extends perpendicularly relative to the first and second sides of the guide block.

21. A method of marking an oblique cut line for forming a second mitered end of a trim piece having a first mitered end extending obliquely between an inside edge and an outside edge of the trim piece, the cut line being located at a desired length of the trim piece, the trim piece further including an end face extending between the inside and out side edges and a top and bottom face of the trim piece, the effective intersections of the end face and the inside and outside edges forming first and second corners, the method comprising the steps of:
    attaching a measurement tool to the mitered end of the trim tool by engaging the end face with engagement tacks of the measurement tool;
    aligning a tape measure with one of the inside or outside edges;
    engaging the measurement tool with an end of the tape measure aligned with the corner formed by the one of the inside or outside edges with the end face;
    extending the tape measure along the one of the inside or outside edges at least beyond the desired length of the trim piece;
    marking a location of a cut line identifying the desired length of the trim piece proximate the one of the inside or outside edges;
    abutting an abutment face of the measurement tool with the one of the inside or outside edge;
    aligning a guide edge of the measurement tool with the marked location; and
    marking a cut line for the second mitered end using the guide edge as a guide, the cut line extending obliquely relative to the inside and outside edges.

* * * * *

UNITED STATES PATENT AND TRADEMARK OFFICE
CERTIFICATE OF CORRECTION

| | |
|---|---|
| PATENT NO. | : 7,509,746 B1 |
| APPLICATION NO. | : 11/854614 |
| DATED | : March 31, 2009 |
| INVENTOR(S) | : Damian A. Kozina and Edward D. Adkins |

It is certified that error appears in the above-identified patent and that said Letters Patent is hereby corrected as shown below:

On the Title Page, the reference listed as 2,144,877 A to Zangrando should be U.S. Patent 2,144,697 A to Zangrando.

Signed and Sealed this

Nineteenth Day of May, 2009

JOHN DOLL
*Acting Director of the United States Patent and Trademark Office*